Oct. 17, 1961  H. F. BUSHONG  3,004,586
AUTOMOBILE ARM REST
Filed Sept. 21, 1959  2 Sheets-Sheet 1
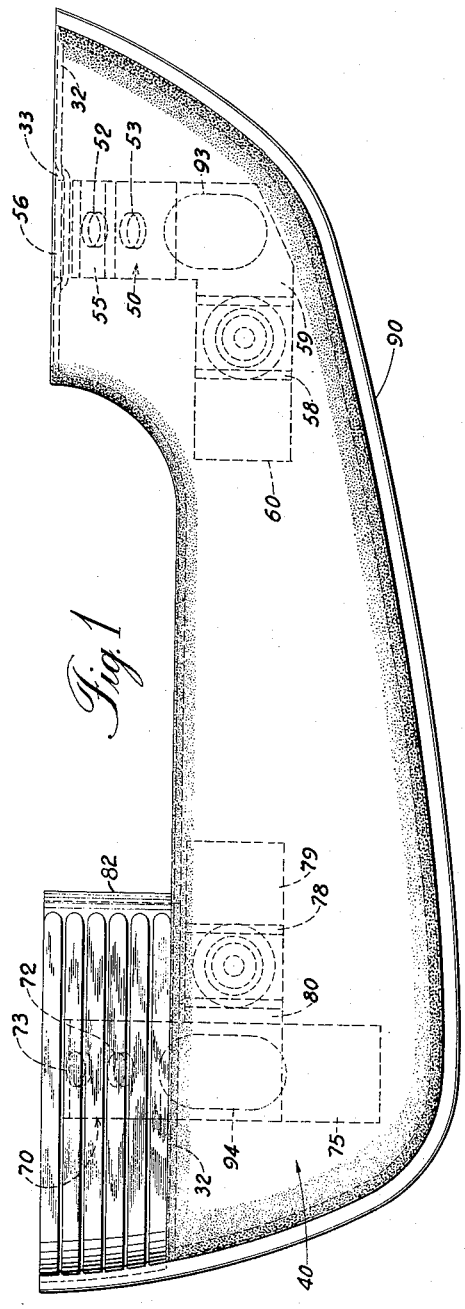
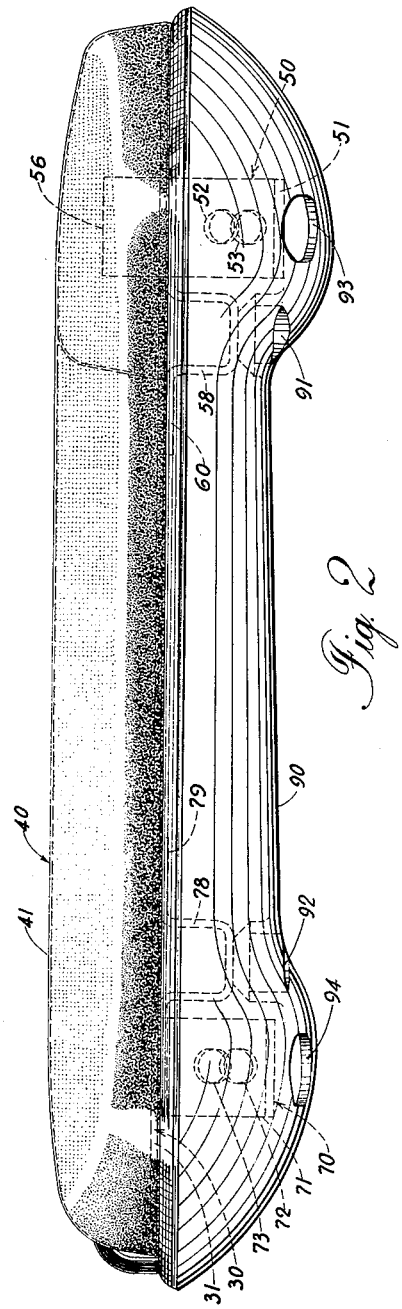
INVENTOR
Harry F. Bushong
BY
Wayne B. Easton

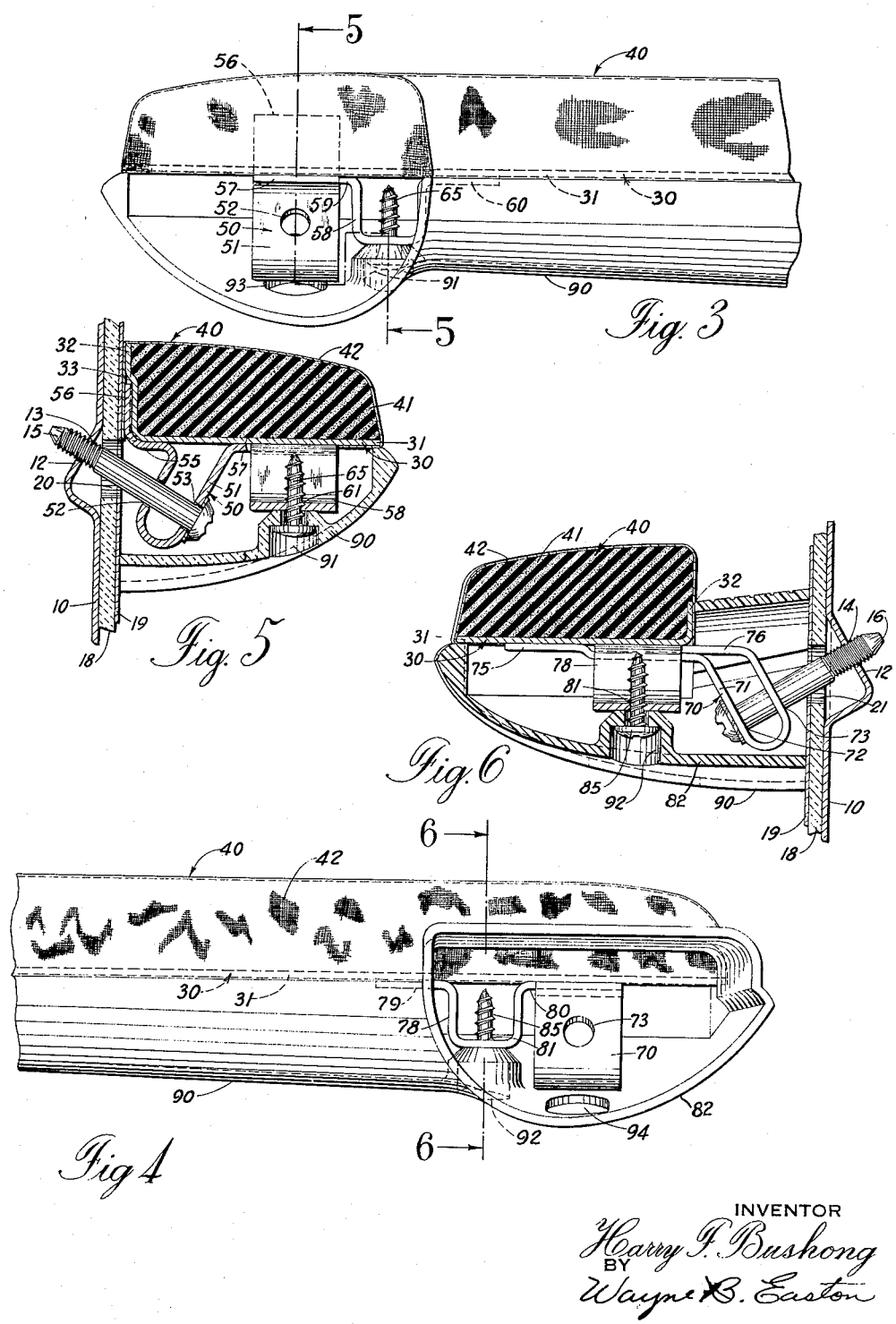

United States Patent Office 3,004,586
Patented Oct. 17, 1961

3,004,586
AUTOMOBILE ARM REST
Harry F. Bushong, South Bend, Ind., assignor to Studebaker-Packard Corporation, South Bend, Ind., a corporation of Michigan
Filed Sept. 21, 1959, Ser. No. 841,141
5 Claims. (Cl. 297—412)

This invention relates to arm rests of the type used in automobiles.

In recent years automobile arm rests of a type having a base portion made of plastic and having a cushion member mounted on top of the base member have come into use. The plastic base portion of arm rests of this type is a structurally strong member by reason of having webs and struts and reenforced apertures for screws but a disadvantage of the plastic base portion is that it requires a relatively large amount of plastic material which makes it relatively expensive to make.

The arm rest of the present invention also has a plastic base member and it may have the same outward appearance as the prior art arm rests referred to. An important difference of my arm rest, however, is that it embodies new and novel means for fastening the arm rest to a door panel independently of its plastic base and the plastic base is thus only used as a decorative cover and is light in weight and requires only a relatively small amount of plastic material to make it.

A main object of the present invention is to provide a new and improved arm rest having new and improved means for fastening it to a vertical wall member such as a door panel.

Another object is to provide a new and improved arm rest having a plastic base member which is primarily decorative and thus requires only a minimum amount of plastic material.

In the drawings:

FIG. 1 is a plan view of an arm rest embodying features of the invention;

FIG. 2 is a front elevation of the arm rest;

FIG. 3 is a view of one end of the rear elevation of the arm rest;

FIG. 4 is a view of the other end of the rear elevation;

FIG. 5 is a sectional view taken on line 5—5 of FIG. 3; and

FIG. 6 is a sectional view taken on line 6—6 of FIG. 4.

The arm rest is adapted to be fastened to a vertical wall member of an automobile which may be a sheet metal door panel 10 as indicated in FIGS. 5 and 6 of the drawings. Panel 10 has an inclined portion 12 with two holes 13 and 14 for threadedly receiving arm rest fastening screws 15 and 16. A sheet of pressed board 18 or the like, to which upholstery material 19 is attached, is used for lining the inside surface of sheet metal panel 10. Holes 20 and 21 are provided in pressed board 18 and upholstery material 19 to permit passage of screws 15 and 16.

It will be noted, especially from FIGS. 1, 5 and 6, that the opposite ends of arm rest are of a different design. As far as the scope of the invention is concerned the design of either end could be used for both ends of the arm rest.

The arm rest has an elongated plate member 30 which is illustrated as having a generally L-shaped horizontal portion 31 and a vertical flange portion 32 on the inner edge of plate member 30 towards door panel 10. As best seen in FIGS. 1 and 5, one end of the vertical flange portion 32 of plate member 30 is recessed to form a pocket 33 for a purpose which will appear hereinafter.

A cushion member 40 is mounted on plate member 30 and consists of resilient material 41 such as rubber and a cover 42 made of a leatherette or vinyl material. In the process of manufacture the cover material 42 is wrapped around the resilient material 41 and is cemented to plate member 30.

Means for attaching the arm rest to door panel 10 comprises two brackets 50 and 70. If the arm rest were of a symmetrical design, as it might be, the brackets 50 and 70 could be identical to each other. Each of the brackets 50 and 70 is formed for use in connection with attaching the case 90 to the plate member 30 and this is a feature of the invention which will be described further on herein.

Bracket 50 has a downwardly extending U-shaped portion 51 and has two aligned apertures 52 and 53 for receiving screw 15 which by reason of the placement of apertures 52 and 53 is inclined upwardly relative to and towards door panel 10. The arrangement is such that U-shaped portion 51 is inclined so as to be perpendicular to the inclined position of screw 15.

Bracket 50 has a horizontal flange portion 55 extending from U-shaped portion 51 towards door panel 10 and a vertical flange portion 56 which extends into and is disposed in the above described pocket 33 of plate member 30. The depth of pocket 33 is equal to the thickness of flange portion 56 so that the exposed surface of flange portion 56 is flush with the surface of the vertical flange portion 32 of plate member 30. Bracket 50 has a second horizontal flange portion 57 extending from U-shaped portion 51 away from door panel 10.

The portion of bracket 50 thus far described can be attached to plate member 30 in various ways as by spot welding flange portions 55, 56 and 57 to surfaces of plate member 30 which they abut as described.

The portion of bracket 50 described thus far is sufficient, in cooperation with bracket 70 to be described further on, for attaching the assembly consisting of the plate member 30 and the cushion member 40 to the door panel 10 with the screws 15 and 16.

Bracket 50 has another portion that is used for attaching casing 90 to plate member 30. As seen in FIGS. 1, 3 and 5, bracket 50 has a downwardly extending U-shaped portion 58 which has horizontal flanges 59 and 60 which are in the same plane as and extend in a direction perpendicular to horizontal flanges 55 and 57. Flanges 59 and 60 may be attached to the lower side of plate member 30 as by spot welding. U-shaped portion 58 of bracket 50 has an aperture 61 for threaded engagement with a screw 65 (shown in FIGS. 3 and 5 but omitted in FIG. 1) for attaching casing 90 to plate member 30.

The shape of and arrangement for bracket 70 is somewhat different than for bracket 50 because the shape of casing 90 is different at that end of the arm rest. Casing 90 is generally C-shaped in its plan view and as seen in FIGS. 4 and 6 it has a generally oval section 82 in a vertical plane at one end and the remaining adjoining part of casing 90 is generally U-shaped in section. Oval section 82 is between door panel 10 and the vertical flange portion 32 of plate member 30 and to accommodate this structure bracket 70 extends outwardly from plate member 30 towards door panel 10.

Bracket 70 has a downwardly extending O-shaped portion 71 and has two aligned apertures 72 and 73 for receiving screw which by reason of the placement of apertures 72 and 73 is inclined upwardly relative to the door panel 10. The arrangement is such that O-shaped portion 71 is inclined so as to be generally perpendicular to the inclined position of screw 16.

Bracket 70 has two overlapping horizontal flange portions 75 and 76 extending from O-shaped portion 71 in a direction away from door panel 10. Each of the flanges 75 and 76 are attached to the lower side of plate member 30 as by spot welding.

The portion of bracket 70 described thus far is sufficient, in cooperation with bracket 50, for attaching the assembly consisting of the plate member 30 and the cushion member 40 to the door panel 10 with the screws 15 and 16.

Bracket 70 has another portion that is used for attaching casing 90 to plate member 30. As seen in FIGS. 1, 4 and 6, bracket 70 has a downwardly extending U-shaped portion 78 which has horizontal flanges 79 and 80 which are perpendicular to horizontal flanges 75 and 76. Flanges 79 and 80 may be attached to the lower side of plate member 30 as by spot welding. U-shaped portion 78 of bracket 70 has an aperture 81 for threaded engagement with a screw 85 (shown in FIGS. 4 and 6 but omitted in FIG. 1) for attaching casing 90 to plate member 30.

Casing 90, which is preferably made of plastic material for decorative purposes, has countersunk type apertures 91 and 92 which may be molded therein which are aligned respectively with apertures 61 and 81 of brackets 50 and 70. Casing 90 is attachable to plate member 30 with screws 65 and 85 which threadedly engage apertures 61 and 81 of brackets 50 and 70.

Casing 90 also has apertures 93 and 94 which are aligned respectively with screws 15 and 16. Screw 15 passes through the apertures 52, 53 and screw 16 passes through apertures 72, 73 in the U-shaped and O-shaped portions respectively of brackets 50 and 70.

The assembly of the arm rest and its attachment to the door panel 10 are as follows: Brackets 50 and 70 are first spot welded to plate member 30. The resilient material 41 is put in position on plate member 30 and the cover material 42 is wrapped around the resilient material and the edges of the cover material are cemented to the outer surfaces of plate member 30. Plastic casing 90 is then attached to plate member 30 with screws 65 and 85. The arm rest is now complete and ready to be attached to door panel 10 with screws 15 and 16 which are inserted through apertures 93 and 94 of casing 90 into threaded engagement with holes 13 and 14 of door panel 10.

The invention may be embodied in other specific forms without departing from the spirit or essential characteristics thereof. The present embodiment of the invention is therefore to be considered in all respects as illustrative and not restrictive, the scope of the invention being indicated by the appended claims rather than by the foregoing description, and all changes which come within the meaning and range of equivalency of the claims are therefore intended to be embraced therein.

It is claimed and desired to secure by Letters Patent:

1. An arm rest adapted to be attached to a vertical wall member such as a door panel, said arm rest comprising an elongated plate member having a horizontal portion, a cushion member positioned on and attached to said horizontal portion of said plate member, bracket means attached to and extending downwardly from said horizontal portion of said plate member at each end thereof each of said bracket means having a depending portion spaced from said vertical wall and having a screw receiving aperture for receiving a screw inclined upwardly towards said door panel, a casing enclosing said bracket means and being operably attached to said horizontal portion of said plate member, said casing having a lower edge portion at each end thereof beneath said bracket means which is adapted for abutting engagement with said wall member, and holes in said casing aligned respectively with the apertures in said bracket means to permit the insertion of screws for attaching the arm rest to said door panel.

2. An arm rest adapted to be attached to a vertical wall member such as a door panel, said arm rest comprising an elongated plate member having a horizontal portion, a cushion member positioned on and attached to said horizontal portion of said plate member, bracket means attached to and extending downwardly from said horizontal portion of plate member at each end thereof, each of said brackets having a depending portion spaced from said vertical wall and having a screw receiving aperture for receiving a screw inclined upwardly towards said door panel, a generally C-shaped casing enclosing said bracket means and being operably attached to said horizontal portion of said plate member, said casing having a portion with a circular section, said circular section being in surrounding relation to said bracket means at the corresponding end of said casing, said casing having a lower edge portion beneath said bracket means at the end opposite said circular section which is adapted for abutting engagement with said wall member, and holes in said casing aligned respectively with the apertures in said brackets to permit the insertion of screws for attaching the arm rest to said door panel.

3. An arm rest adapted to be attached to a vertical wall member such as a door panel, said arm rest comprising an elongated plate member having a horizontal portion, a cushion member positioned on and attached to said horizontal portion of said plate member, bracket means attached to said horizontal portion of plate member having a downwardly extending generally U-shaped portion which is spaced from said vertical wall member and having a screw receiving aperture for receiving a screw inclined upwardly towards said door panel, a casing enclosing said bracket means and being operably attached to said horizontal portion of said plate member, said casing having a lower edge portion at each end thereof beneath said bracket means which is adapted for abutting engagement with said wall member, and a hole in said casing aligned respectively with the aperture in said bracket means to permit the insertion of screw means for attaching the arm rest to said door panel.

4. An arm rest adapted to be attached to a vertical wall member such as a door panel, said arm rest comprising an elongated plate member having a horizontal portion, a cushion member positioned on and attached to said horizontal portion of said plate member, bracket means attached to and extending downwardly from said horizontal portion of said plate member at each end thereof, each of said brackets having a screw receiving aperture for receiving a screw inclined upwardly towards said door panel, one of said bracket means including a lug portion having a threaded hole, a casing enclosing said bracket means and having a countersunk hole aligned with said threaded hole of said lug for receiving screw means to attach said casing to the bottom of said plate member, said casing having a lower edge portion at each end thereof beneath said bracket means which is adapted for abutting engagement with said wall member, and holes in said casing aligned respectively with said apertures in said brackets to permit the insertion of screws for attaching the arm rest to said door panel.

5. An arm rest adapted to be attached to a vertical wall member such as a door panel, said arm rest comprising an elongated plate member having a horizontal portion and a vertical flange portion for abutting engagement with said door panel, a cushion member attached to said plate member in engagment with said horizontal and vertical portions, said vertical flange portion being recessed to form a pocket, bracket means attached to and extending downwardly from said plate member at each end thereof, each of said brackets having a depending portion spaced from said vertical wall and having a screw receiving aperture for receiving a screw inclined upwardly towards said door panel, one of said bracket means having a vertically extending flange disposed in said pocket of said vertical flange portion and being operably attached to the bottom of said plate member, a casing enclosing said bracket means and being attached to said horizontal portion of said plate member, said casing having a lower edge portion at each end thereof beneath said bracket means which is adapted for abutting engagement with said wall member, and holes in said casing aligned respectively with the apertures in said brackets to permit the insertion of screws for attaching the arm rest to said door panel.

References Cited in the file of this patent

UNITED STATES PATENTS

| | | |
|---|---|---|
| 2,565,211 | Doty | Aug. 21, 1951 |
| 2,601,677 | Wettlaufer | June 24, 1952 |
| 2,661,052 | Bushong | Dec. 1, 1953 |

FOREIGN PATENTS

| | | |
|---|---|---|
| 247,020 | Great Britain | Feb. 11, 1926 |